United States Patent
Meyers

(10) Patent No.: US 10,282,000 B2
(45) Date of Patent: May 7, 2019

(54) TOUCHPAD WITH MULTIPLE TACTILE SWITCHES

(71) Applicant: DELL PRODUCTS L.P., Round Rock, TX (US)

(72) Inventor: David Michael Meyers, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 156 days.

(21) Appl. No.: 14/633,004

(22) Filed: Feb. 26, 2015

(65) Prior Publication Data
US 2016/0252986 A1    Sep. 1, 2016

(51) Int. Cl.
*G06F 3/041*    (2006.01)
*G06F 1/16*    (2006.01)
*G06F 3/0354*    (2013.01)

(52) U.S. Cl.
CPC .............. *G06F 3/041* (2013.01); *G06F 1/169* (2013.01); *G06F 3/03547* (2013.01)

(58) Field of Classification Search
CPC ....... G06F 3/041; G06F 3/03547; G06F 1/169
See application file for complete search history.

(56) References Cited

U.S. PATENT DOCUMENTS

| 2004/0056876 | A1* | 3/2004 | Nakajima | G06F 3/0488 715/702 |
| 2010/0079404 | A1* | 4/2010 | Degner | G06F 3/03547 345/174 |
| 2010/0139990 | A1 | 6/2010 | Westerman et al. | |
| 2011/0233039 | A1* | 9/2011 | Takita | H01H 25/041 200/5 A |
| 2014/0210735 | A1 | 7/2014 | Chang | |
| 2015/0378492 | A1* | 12/2015 | Rosenberg | G06F 3/0414 345/174 |
| 2016/0209876 | A1* | 7/2016 | Park | G06F 1/1652 |

FOREIGN PATENT DOCUMENTS

GB    2464584    4/2010

OTHER PUBLICATIONS

International Search Report and Written Opinion, Application No. PCT/US2016/012336, 11 pages, dated Apr. 12, 2016.
International Preliminary Report on Patentability received for PCT Patent Application No. PCT/US2016/012336, dated Sep. 8, 2017; 8 pages.

* cited by examiner

*Primary Examiner* — Sahlu Okebato
(74) *Attorney, Agent, or Firm* — Baker Botts L.L.P.

(57) ABSTRACT

A touchpad may include multiple tactile switches for click event functionality. The use of the multiple tactile switches may improve tactile feedback for a user and may improve a service lifetime of the touchpad.

16 Claims, 4 Drawing Sheets

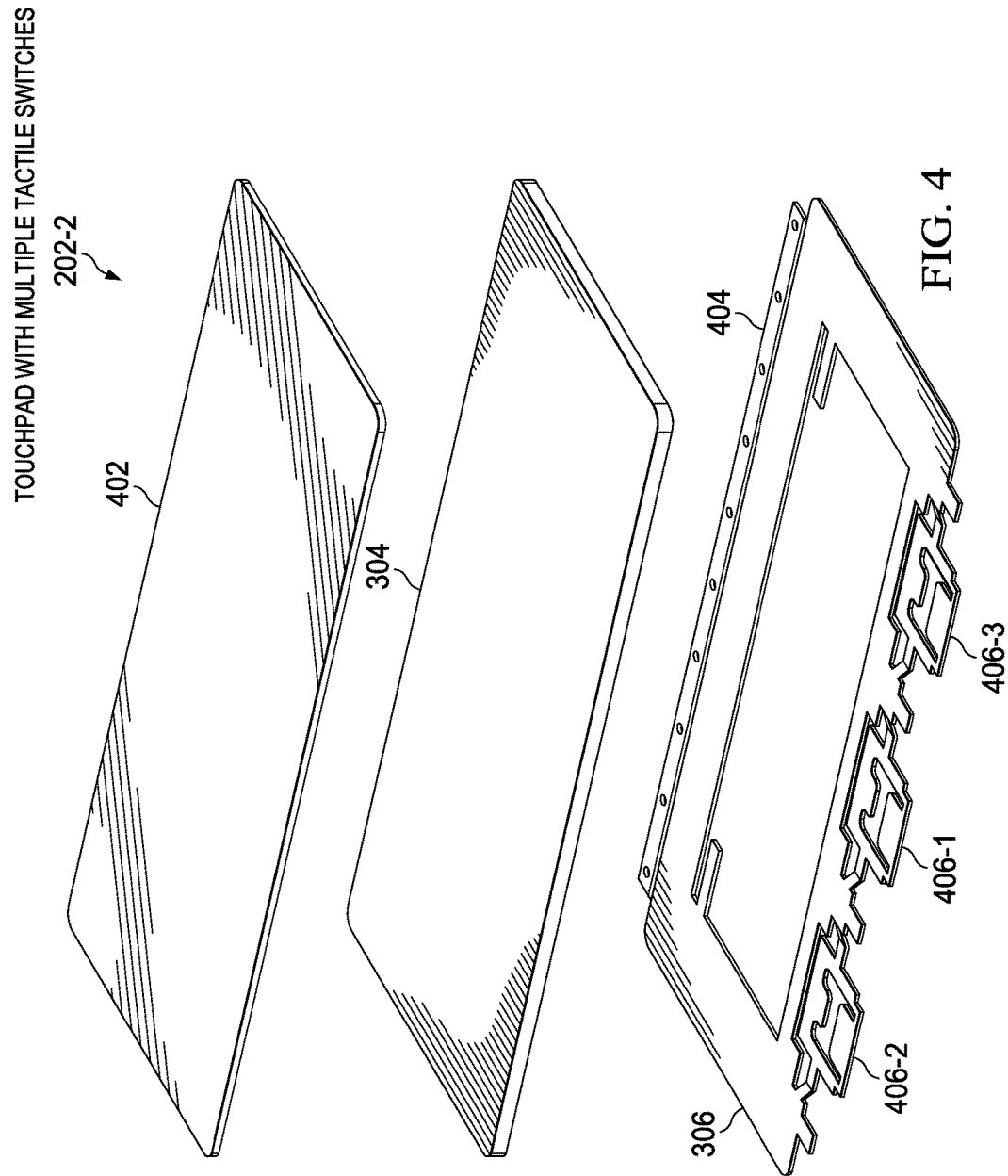

TOUCHPAD WITH MULTIPLE TACTILE SWITCHES

BACKGROUND

Field of the Disclosure

This disclosure relates generally to information handling systems and, more particularly, to a touchpad with multiple tactile switches.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, laptop computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices may be powered using a rechargeable battery.

In certain instances, an information handling system may include a touchpad for user interaction.

SUMMARY

In one aspect, a disclosed a touchpad device includes a touch sensor for detecting touch events that is hingeably attached at a first edge to an information handling system. The touchpad device also includes a plurality of tactile switches coupled to the touch sensor to detect click events. In the touchpad device, the tactile switches may be coupled to the touch sensor at a second edge opposite the first edge.

In any disclosed embodiment of the touchpad device, the plurality of tactile switches may include three tactile switches.

In any disclosed embodiment of the touchpad device, a click event detected by the plurality of tactile switches may result from activation of at least one of the plurality of tactile switches.

In any disclosed embodiment, the touchpad device may include a logical OR gate electrically coupled to the plurality of tactile switches.

In any disclosed embodiment of the touchpad device, the touch sensor may be a capacitive touch glass.

In any disclosed embodiment of the touchpad device, the touch sensor may be rectangularly shaped.

In any disclosed embodiment of the touchpad device, the touch sensor may be integrated into an outer surface of the information handling system, while the information handling system may be a portable device.

In any disclosed embodiment of the touchpad device, the plurality of tactile switches may be linearly arranged at the second edge.

In any disclosed embodiment of the touchpad device, the plurality of tactile switches may be equally spaced apart from each other.

Other disclosed aspects include an information handling system including the touchpad.

BRIEF DESCRIPTION OF THE DRAWINGS

For a more complete understanding of the present invention and its features and advantages, reference is now made to the following description, taken in conjunction with the accompanying drawings, in which:

FIG. 4 is a block diagram of selected elements of an embodiment of a touchpad with multiple tactile switches.

DESCRIPTION OF PARTICULAR EMBODIMENT(S)

Figure 1:
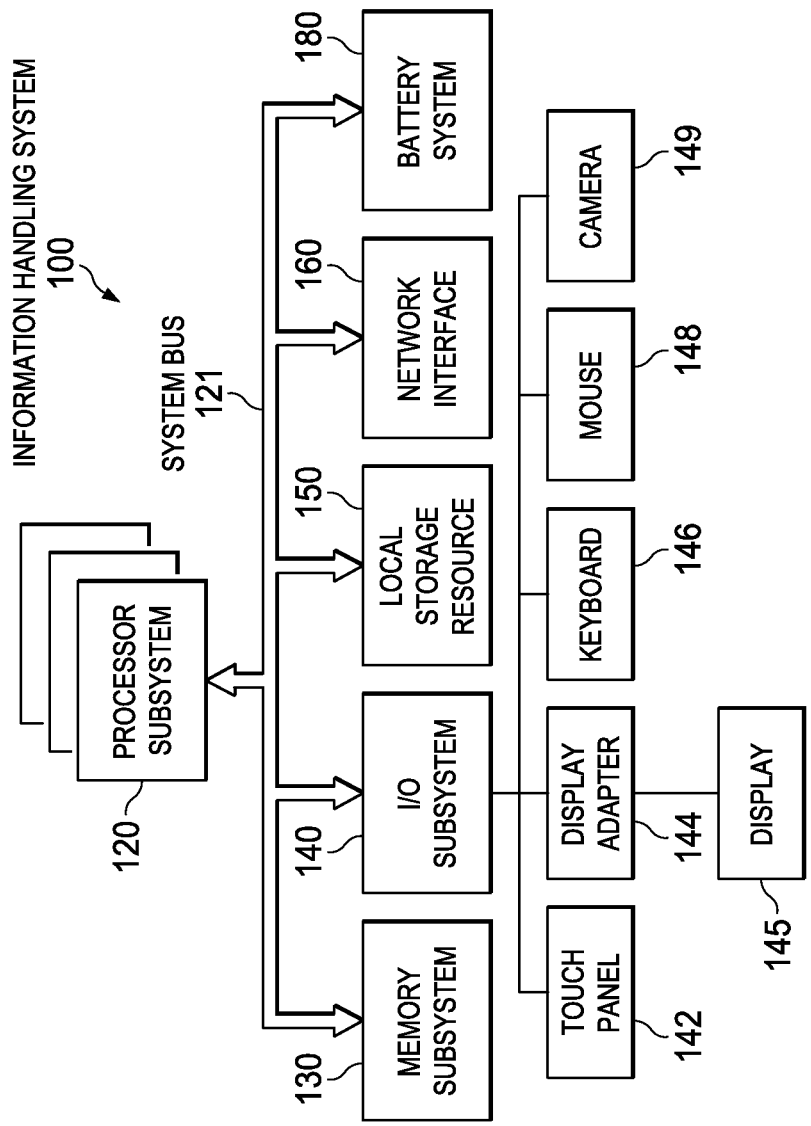
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), or flash memory (SSD), as well as communications media such wires, optical fibers, microwaves, radio waves, and other electromagnetic or optical carriers, or any combination of the foregoing.

Certain information handling systems implemented as portable devices may include a touchpad that provides mouse-like point and click functionality that is integrated into an outer surface of the information handling system, such as laptops and notebooks. The touchpad may include a touch sensor to detect the presence and position of one or more fingertips that are in contact with the touch sensor, which are referred to as "touch events". The touch sensor is typically comprised of a capacitive glass plate that forms a working surface of the touchpad, which may be installed at the outer surface of the information handling system. In some embodiments, the touchpad may be implemented as a separate peripheral device for use with the information handling system. The touchpad may further include a switch that is activated when the touch sensor is depressed to emulate activation of mouse buttons (mouse clicks), which are referred to as "click events". In this manner, the touchpad may emulate various functionality of the mouse without relying on an external device. Typical touchpads utilize a single mechanical switch, referred to as a "tactile switch" for registering click events using a cantilever design in which the touch sensor is hinged at a first edge and the tactile switch is activated at the second edge opposite the first edge. Because the tactile switch is a primary moveable component in the touchpad, the tactile switch and associated mechanical support elements may be a primary source of wear in the touchpad and may be determinative for a service lifetime of the touchpad.

As will be described in further detail herein, the inventor of the present disclosure has discovered that the use of additional tactile switches in a touchpad provides significant advantages over the use of a single tactile switch. The touchpad with multiple tactile switches disclosed herein may provide consistent tactile feedback and may remain stable over time. The touchpad with multiple tactile switches disclosed herein may improve tactile feedback for click events. The touchpad with multiple tactile switches disclosed herein may reduce failures from worn out tactile switches and related components, such as fatigue in springs and supporting elements of the touchpad cantilever mechanism, by spreading mechanical wear over the multiple tactile switches, instead of at a single tactile switch. The touchpad with multiple tactile switches disclosed herein may use the multiple tactile switches in parallel such that activation of any tactile switch triggers the click event.

Particular embodiments are best understood by reference to FIGS. 1, 2, 3, and 4 wherein like numbers are used to indicate like and corresponding parts.

Turning now to the drawings, FIG. 1 illustrates a block diagram depicting selected elements of an embodiment of information handling system 100. In various embodiments, information handling system 100 may represent different types of devices, including portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard, including, but not limited to, various network transmission protocols and standards. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or other digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power is removed. Local storage resource 150 may comprise computer-readable media (e.g., hard disk drive, floppy disk drive, CD-ROM, or other type of rotating storage media, flash memory, EEPROM, or another type of solid state storage media) and may be generally operable to store instructions and data. As shown, memory subsystem 130 stores virtual input device (VID) module 132 for user interaction with information handling systems using arbitrary objects, as will be described in further detail. Memory subsystem 130 also stores application 134, which may represent any application executable on information handling system 100 and may be enabled for user interaction with information handling systems using arbitrary objects, in conjunction with VID module 132.

In information handling system 100, I/O subsystem 140 may comprise a system, device, or apparatus generally operable to receive or transmit data to or from or within system 100. I/O subsystem 140 may represent, for example, any of a variety of communication interfaces, graphics interfaces, video interfaces, user input interfaces, and peripheral interfaces. As shown, I/O subsystem 140 may comprise touch panel 142, display adapter 144, keyboard 146, touch pad 148, and camera 149. Touch panel 142 and touchpad 148 may include circuitry for enabling touch functionality in conjunction with display 145 that is driven by display adapter 144. Touchpad 148 and keyboard 146 may represent physical input devices that are integrated into information handling system 100 when information handling system 100 is a portable device.

In operation, information handling system 100 may be a portable device enabled for user interaction using touchpad 148. In certain embodiments, touchpad 148 may be an external device coupled to information handling system 100. Touchpad 149 may include multiple tactile switches that operate in parallel to detect click events, as will be described in further detail.

Figure 2:
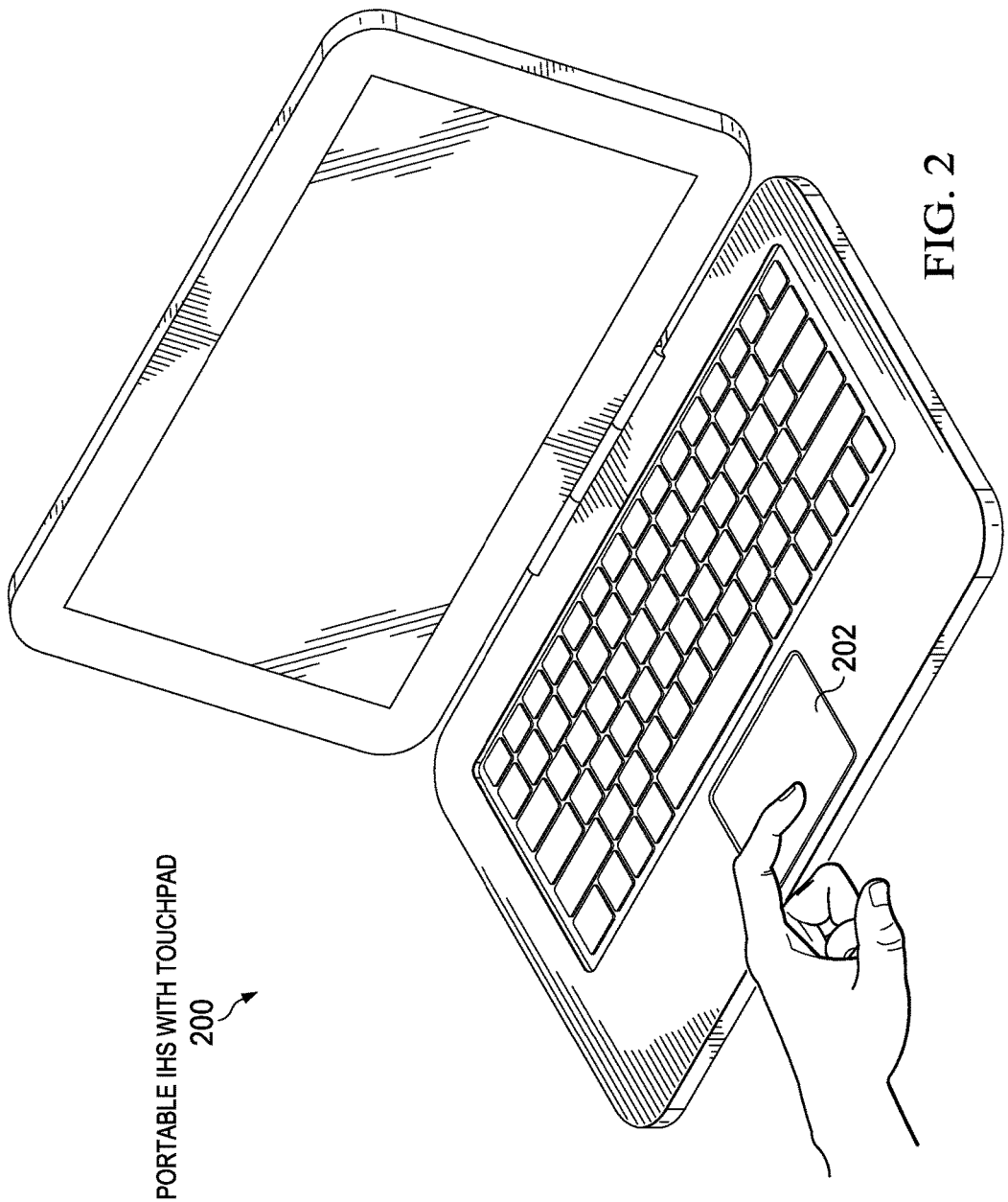
FIG. 2 is a block diagram of selected elements of an embodiment of a portable information handling system with a touchpad.

Referring now to FIG. 2, selected elements of an embodiment of portable information handling system 200 are illustrated. As shown, portable information handling system 200 may be an embodiment of information handling system 100 in FIG. 1. Portable information handling system 200 is a laptop computer that may represent various portable devices having touchpad 202 integrated therein on an outer surface accessible to a user. As noted, in different embodiments, touchpad 202 may be implemented as a separate device that is used with portable information handling system 200. Touchpad 202 may be an embodiment of touchpad 148 in FIG. 1.

Figure 3:
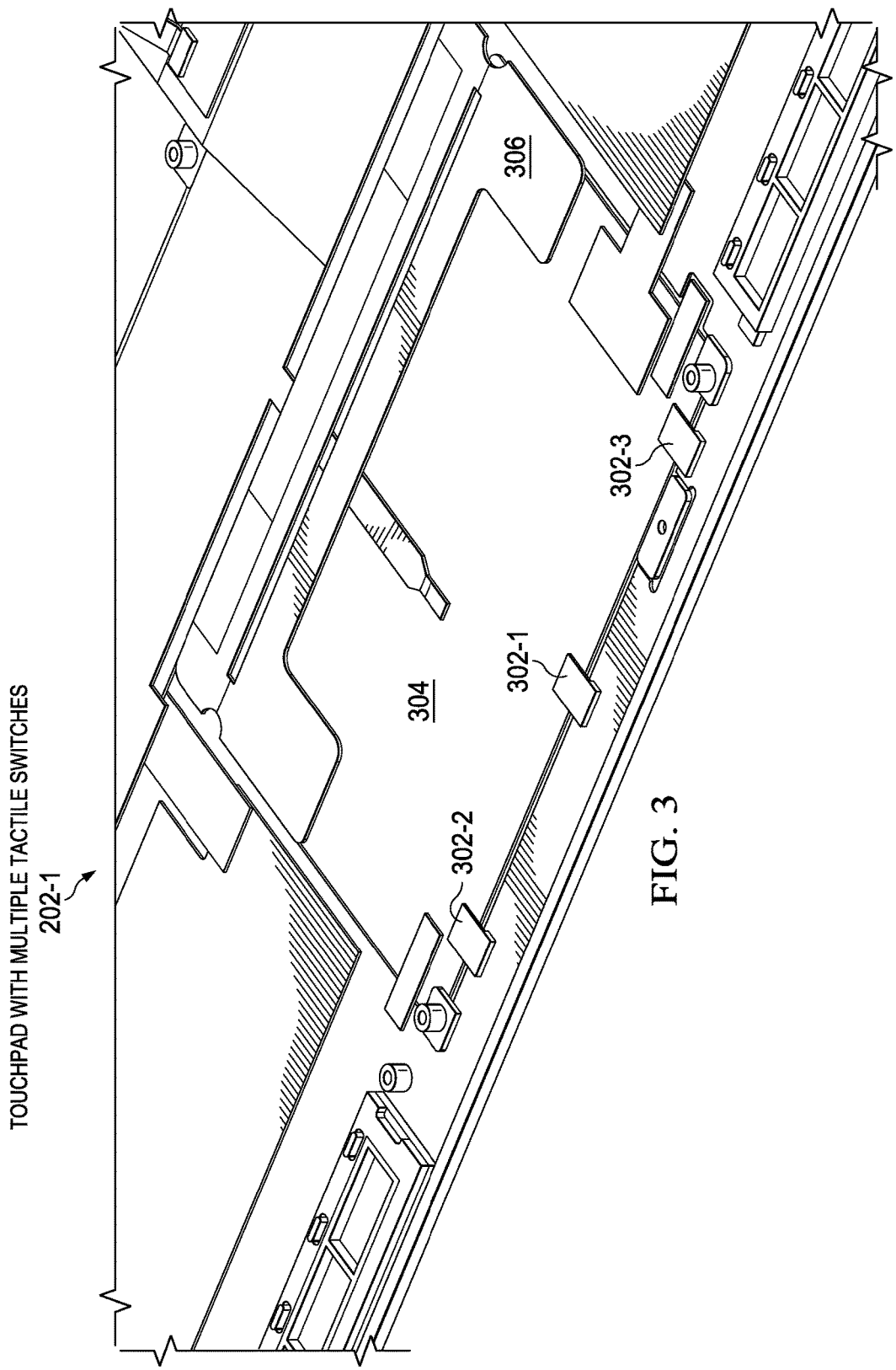
FIG. 3 is a block diagram of selected elements of an embodiment of a touchpad with multiple tactile switches.

Referring now to FIG. 3, selected elements of an embodiment of touchpad 202-1 are illustrated. FIG. 3 is a schematic illustration and is not drawn to scale. As shown, touchpad 202-1 may be an embodiment of touchpad 202 and touchpad 148. In FIG. 3, additional construction details of touchpad 202 integrated in portable information handling system 200 are illustrated. Specifically, touchpad 202-1 includes frame 306 that may be hingeably attached at a first edge to information handling system 200. Hingeable attachment of frame 306 to information handling system may allow for at least some rotation about a fixed axis, such as about the first edge. Because frame 306 may be hingeably attached, frame 306 may undergo a certain amount of displacement in a vertical direction that is normal to a top surface of touchpad 202-1. Frame 306 may further carry printed circuit board 304 that enables various functionality for touchpad 202-1, including a touch sensor interface, a host system interface, and interfaces for tactile switches 302. Tactile switches 302 may be mounted on printed circuit board (PCB) 304 and frame 306 at a second edge of frame 306 that is opposite the first edge. Touchpad 202 may further include a touch sensor that is a capacitive glass (not shown, see FIG. 4) that covers the subassembly shown in FIG. 3. As a result of the displacement from the hingeable attachment of frame 306, which may carry the capacitive glass in touchpad 202, frame 306 and the capacitive glass may be enabled to activate tactile switches 302, for example, when a user depresses the capacitive glass to input a click event. Because frame 306 undergoes a relatively small angular displacement at the hingeable attachment, the user may perceive the displacement as being a vertical translation of the capacitive glass that activates tactile switches 302.

As shown in FIG. 2, touchpad 202-1 includes three tactile switches 302-1, 302-2, 303-3. In given embodiments, tactile switches 302 may be equally spaced apart from one another in a linear manner along a line that is parallel to the first edge. In this manner, tactile switches 302 may experience approximately the same mechanical loading, and therefore, may be subject to the same mechanical wear as each other. In other embodiments, a spacing between any two tactile switches 302 may be less than a given value to limit loading on any one of tactile switches 302. Furthermore, tactile feedback is improved due to the distribution of the force feedback among multiple tactile switches 302, which enables more consistent tactile feedback in various usage scenarios. In some embodiments, tactile switches 302 may include a spring for momentary switch action. In other embodiments, touchpad 202-1 may include one or more external springs to release the touch sensor after a touch event and to enable the momentary action of tactile switches 302. In various embodiments, tactile switches 302 are single-pole single-throw (SPST) switches that make electrical contact when depressed (close when activated) and that normally make no electrical contact (normally open). It is noted that in different embodiments, different types and polarities may be used for tactile switches 302, such as normally closed, for example. Furthermore, PCB 304 may include circuitry for implementing parallel functionality with tactile switches 302, such as an OR gate to provide an activation signal to information handling system 200 when any one of tactile switches 302 is depressed.

Referring now to FIG. 4, selected elements of an embodiment of touchpad 202-2 are illustrated. FIG. 4 is a schematic illustration and is not drawn to scale. As shown, touchpad 202-2 may be an embodiment of touchpad 202 and touchpad 148 (see FIGS. 1, 2, and 3). In FIG. 4, touchpad 202-2 is shown in an exploded view including capacitive glass 402, PCB 304, and frame 306. It is noted that capacitive glass 402 is substantially rectangular (or square) in shape. Frame 404 is shown with hinge portion 404 at a first edge and switch mounts 406 at a second edge opposite the first edge. Tactile switches 302 are not shown in FIG. 4 for descriptive clarity. Specifically, switch mount 406-1 may receive tactile switch 302-1, switch mount 406-2 may receive tactile switch 302-2, and switch mount 406-3 may receive tactile switch 302-3. As shown, switch mounts 406 are equally spaced from one another along a line at the second edge that is parallel to the first edge. In various embodiments, different configurations and numbers of switch mounts 406 and corresponding tactile switches 302 may be used.

As disclosed herein, a touchpad may include multiple tactile switches for click event functionality. The use of the multiple tactile switches may improve tactile feedback for a user and may improve a service lifetime of the touchpad.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A touchpad device, comprising:
   a touch sensor for detecting touch events, the touch sensor hingeably attached at a first edge to an information handling system;
   a plurality of mechanical tactile switches coupled to the touch sensor that operate in parallel using parallel functionality to detect a click event input by a user by depressing the touch sensor,
   wherein the mechanical tactile switches are coupled to the touch sensor at a second edge opposite the first edge; and
   circuitry for implementing the parallel functionality of the plurality of mechanical tactile switches by triggering the click event in response to activation of any one or more of the plurality of mechanical tactile switches due to an angular displacement of the touch sensor at the point at which the touch sensor is hingeably attached, the circuitry comprising a logical OR gate electrically coupled to the plurality of mechanical tactile switches to provide an activation signal when any one or more of the plurality of mechanical tactile switches is depressed.

2. The touchpad device of claim 1, wherein the plurality of mechanical tactile switches includes three mechanical tactile switches.

3. The touchpad device of claim 1, wherein detection of the click event by the plurality of mechanical tactile switches results from activation of at least one of the plurality of mechanical tactile switches.

4. The touchpad device of claim 1, wherein the touch sensor is a capacitive touch glass.

5. The touchpad device of claim 1, wherein the touch sensor is rectangularly shaped.

6. The touchpad device of claim 1, wherein the touch sensor is integrated into an outer surface of the information handling system, wherein the information handling system is a portable device.

7. The touchpad device of claim 1, wherein the plurality of mechanical tactile switches are linearly arranged at the second edge.

8. The touchpad device of claim 7, wherein the plurality of mechanical tactile switches are equally spaced apart from each other.

9. An information handling system, comprising: a touchpad device, further comprising:
   a touch sensor for detecting touch events, the touch sensor hingeably attached at a first edge to an information handling system;
   a plurality of mechanical tactile switches coupled to the touch sensor that operate using parallel functionality to detect a click event input by a user by depressing the touch sensor, wherein the mechanical tactile switches are coupled to the touch sensor at a second edge opposite the first edge; and
   circuitry for implementing the parallel functionality of the plurality of mechanical tactile switches by triggering the click event in response to activation of any one or more of the plurality of mechanical tactile switches due to an angular displacement of the touch sensor at the point at which the touch sensor is hingeably attached, the circuitry comprising a logical OR gate electrically coupled to the plurality of mechanical tactile switches to provide an activation signal when any one or more of the plurality of mechanical tactile switches is depressed.

10. The information handling system of claim 9, wherein the plurality of mechanical tactile switches includes three mechanical tactile switches.

11. The information handling system of claim 9, wherein detection of the click event by the plurality of mechanical tactile switches results from activation of at least one of the plurality of mechanical tactile switches.

12. The information handling system of claim 9, wherein the touch sensor is a capacitive touch glass.

13. The information handling system of claim 9, wherein the touch sensor is rectangularly shaped.

14. The information handling system of claim 9, wherein the touch sensor is integrated into an outer surface of the information handling system, wherein the information handling system is a portable device.

15. The information handling system of claim 9, wherein the plurality of mechanical tactile switches are linearly arranged at the second edge.

16. The information handling system of claim 15, wherein the plurality of mechanical tactile switches are equally spaced apart from each other.

\* \* \* \* \*